United States Patent
Oh et al.

(10) Patent No.: US 11,548,493 B2
(45) Date of Patent: Jan. 10, 2023

(54) APPARATUS OF CONTROLLING HYBRID VEHICLE HAVING ELECTRIC SUPERCHARGER AND METHOD THEREOF

(71) Applicants: Hyundai Motor Company, Seoul (KR); Kia Motors Corporation, Seoul (KR)

(72) Inventors: Heechang Oh, Gyeonggi-do (KR); Dong Hee Han, Gyeonggi-do (KR); Hyunjin Kang, Gyeonggi-do (KR); Kwanhee Lee, Gyeonggi-do (KR); Yeongseop Park, Seoul (KR); Seungwoo Hong, Seoul (KR); Jonghyeok Lee, Gyeonggi-do (KR); Yong Kak Choi, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 299 days.

(21) Appl. No.: 16/895,665

(22) Filed: Jun. 8, 2020

(65) Prior Publication Data
US 2021/0107447 A1 Apr. 15, 2021

(30) Foreign Application Priority Data
Oct. 15, 2019 (KR) .................. 10-2019-0127695

(51) Int. Cl.
*B60W 10/26* (2006.01)
*B60W 20/10* (2016.01)
(Continued)

(52) U.S. Cl.
CPC .............. *B60W 20/10* (2013.01); *B60K 6/24* (2013.01); *B60K 6/26* (2013.01); *B60K 6/28* (2013.01);
(Continued)

(58) Field of Classification Search
CPC ............. B60W 20/10; B60W 2555/20; B60W 2210/10; B60W 2510/0638;
(Continued)

(56) References Cited

U.S. PATENT DOCUMENTS 6,370,935 B1 * 4/2002 He ................... F02D 41/0072
702/100
9,074,523 B2 * 7/2015 Ulrey .................. F02B 37/16
(Continued)

FOREIGN PATENT DOCUMENTS

KR 100792893 B1 1/2008

*Primary Examiner* — Tinh Dang
(74) *Attorney, Agent, or Firm* — Fox Rothschild LLP

(57) ABSTRACT

A control apparatus for a hybrid vehicle includes an engine that combusts fuel to generate power. A drive motor assists the engine power and selectively operates as a generator to generate electrical energy. A clutch is disposed between the engine and drive motor. A battery supplies electrical energy to the drive motor or is charged by the generated electrical energy. A DC converter transforms a DC from the battery. An electric supercharger supplies supercharged air to the engine. A controller determines an optimal air amount to maximize system efficiency based on a drive motor limited output value determined by a battery SOC, and determines an output drive motor power output and an output engine power output based on the optimal air amount when an atmospheric pressure is less than a predetermined pressure, intake temperature is greater than a predetermined temperature and the SOC is less than a predetermined value.

6 Claims, 7 Drawing Sheets

(51) Int. Cl.
  *B60K 6/38*   (2007.10)
  *B60K 6/28*   (2007.10)
  *B60K 6/26*   (2007.10)
  *B60K 6/24*   (2007.10)
  *B60K 6/46*   (2007.10)
  *F02B 39/10*  (2006.01)
(52) U.S. Cl.
  CPC .............. *B60K 6/38* (2013.01); *B60K 6/46* (2013.01); *B60W 10/26* (2013.01); *F02B 39/10* (2013.01); *B60L 2210/10* (2013.01); *B60W 2510/0638* (2013.01); *B60W 2510/0666* (2013.01); *B60W 2510/083* (2013.01); *B60W 2510/244* (2013.01); *B60W 2555/20* (2020.02); *B60Y 2200/92* (2013.01); *B60Y 2300/188* (2013.01)
(58) Field of Classification Search
  CPC ..... B60W 2510/244; B60K 6/24; B60K 6/26; B60K 6/28; B60K 6/38; B60K 6/46; F02B 39/10; B60Y 2200/92; B60Y 2300/188
  See application file for complete search history.

(56) References Cited

U.S. PATENT DOCUMENTS

| | | | | |
|---|---|---|---|---|
| 10,731,577 | B2* | 8/2020 | Kelly | F02B 37/10 |
| 10,738,672 | B2* | 8/2020 | Harmsen | F01N 5/04 |
| 2014/0081564 | A1* | 3/2014 | Pursifull | G01M 15/08 |
| | | | | 701/101 |
| 2017/0008509 | A1* | 1/2017 | Sato | B60W 10/26 |
| 2017/0016388 | A1* | 1/2017 | Xiao | F02B 39/10 |
| 2019/0226391 | A1* | 7/2019 | Buckland | F02B 39/10 |
| 2019/0353108 | A1* | 11/2019 | Han | F02D 41/005 |

* cited by examiner

APPARATUS OF CONTROLLING HYBRID VEHICLE HAVING ELECTRIC SUPERCHARGER AND METHOD THEREOF

CROSS-REFERENCE TO RELATED APPLICATION

This application claims priority to and the benefit of Korean Patent Application No. 10-2019-0127695 filed on Oct. 15, 2019, the entire contents of which are incorporated herein by reference.

BACKGROUND

(a) Field of the Invention

The present disclosure relates to an apparatus of controlling a hybrid vehicle including an electric supercharger and, more particularly, an apparatus and method of controlling a hybrid vehicle to determine an optimal operating line of an engine when an output of a drive motor is limited by a state of charge of a battery.

(b) Description of the Related Art

A hybrid vehicle is a vehicle that uses two or more power sources and generally refers to a hybrid electric vehicle driven using an engine and a motor. A hybrid electric vehicle may form various structures using two or more power sources including an engine and a motor. In general, a hybrid electric vehicle uses a power train in a manner of a transmission mounted electronic device (TMED) in which a drive motor, a transmission, and drive shaft are connected in series.

In addition, a clutch is disposed between an engine and a motor, and the hybrid electric vehicle is driven in an electric vehicle (EV) mode or in a hybrid electric vehicle (HEV) mode, depending on whether the clutch is engaged. The EV mode is a mode in which a vehicle is driven by driving torque of a drive motor, and the HEV mode is a mode in which the vehicle is driven by driving torque of the drive motor and the engine.

In the hybrid vehicle, it is important to manage the state of charge (SOC), which is a charged amount of a battery that supplies power to the drive motor and electrical components provided in the vehicle. Particularly, when the hybrid vehicle drives in a high elevated area, the engine output decreases since an intake pressure flowing into the engine is low. In addition, when the vehicle drives in a high temperature region, since the density of air flowing into the engine is low and an engine torque is decreased due to knocking, the engine output decreases. Accordingly, when the required torque of the driver through the drive motor is increased, and the SOC of the battery is reduced due to frequent operation of the drive motor. In particular, since the engine output is unable be assisted through the drive motor, to meet the required torque of the driver, the engine is operated in a high load/high speed state, thereby deteriorating fuel efficiency and exhaust gas.

The above information disclosed in this section is merely for enhancement of understanding of the background of the disclosure, and therefore it may contain information that does not form the prior art that is already known in this country to a person of ordinary skill in the art.

SUMMARY

The present disclosure provides an apparatus of controlling an engine including an electric supercharger and a method thereof, having advantages of satisfying a required torque of a driver and a minimizing a loss of fuel efficiency when a vehicle is driven in a high elevated area where an atmospheric pressure and a temperature of an intake air are low.

An apparatus of controlling a hybrid vehicle including an electric supercharger according to an exemplary embodiment of the present disclosure may include an engine configured to combust fuel to generate power; a drive motor configured to assist the power of the engine and to selectively operate as a generator to generate electrical energy; a clutch configured to be disposed between the engine and the drive motor; a battery configured to supply electrical energy to the drive motor or to be charged by the electrical energy generated at the drive motor; a direct current (DC) converter configured to transform a direct current output from the battery; an electric supercharger configured to supply supercharged air to the engine; and a controller configured to determine an optimal air amount to maximize a system efficiency based on a limited output value of the drive motor determined by a state of charge (SOC) of the battery, and determine a drive motor power output from the drive motor and an engine power output from the engine based on the optimal air amount when an atmospheric pressure is less than a predetermined pressure, intake temperature is greater than a predetermined temperature and the SOC is less than a predetermined value.

The system efficiency may be determined from a require power of a driver, a fuel amount supplied to the engine, a low calorific power of fuel, a consumed power in the electric supercharger, an output power supplied to the DC converter, an engine power output from the engine, an efficiency of the drive motor, and power transmission efficiency. The system efficiency may be determined from an equation of $$sys.eff. = \frac{P_{driver}}{M_{fuel} \times LHV + \left(P_{eSC} + P_{LDC} + \frac{P_{driver} - P_{eng}}{\eta_{mot}}\right)/\eta_{tran}},$$

wherein $P_{drive}$ is a required power of a driver, $M_{fuel}$ is fuel amount supplied to the engine, LHV is a low calorific power of fuel, $P_{esc}$ is consumed power in the electric supercharger, $P_{LDC}$ is a supplied power t the DC converter, $P_{eng}$ is an engine power, $\eta_{mot}$ is an efficiency of the drive motor, and $\eta_{tran}$ is a power transmission efficiency.

A method of controlling a hybrid vehicle including an electric supercharger according to another exemplary embodiment of the present disclosure may include receiving, by a controller, a driving information including a required power of a driver, an engine speed, a state of charge (SOC) of a battery, an atmospheric pressure, and an intake temperature; determining, by the controller, an optimal air amount to maximize a system efficiency based on a limited output value of the drive motor determined by the SOC of the battery when the SOC is less than a predetermined value; determining, by the controller, an engine torque output from the engine from the optimal air amount; and determining, by the controller, an output torque of the drive motor for satisfying the required torque of the driver from the engine torque.

The system efficiency may be determined from a require power of a driver, a fuel amount supplied to the engine, a low calorific power of fuel, a consumed power in the electric supercharger, an output power output from the DC converter, an engine power output from the engine, an efficiency of the drive motor, and power transmission efficiency. The system efficiency may be determined from an equation of $$sys.eff. = \frac{P_{driver}}{M_{fuel} \times LHV + \left(P_{eSC} + P_{LDC} + \frac{P_{driver} - P_{eng}}{\eta_{mot}}\right)/\eta_{tran}},$$

wherein $P_{drive}$ is a required, power of a driver, $M_{fuel}$ is fuel amount supplied to the engine, LHV is a low calorific power of fuel, $P_{esc}$ is consumed power in the electric supercharger, $P_{LDC}$ is a supplied power to the DC converter, $P_{eng}$ is an engine power, $\eta_{mot}$ is an efficiency of the drive motor, $\eta_{tran}$ is a power transmission efficiency.

According to an apparatus of controlling an engine including an electric supercharger and a method thereof, it may be possible to satisfying a required torque of a driver and minimizing a loss of loss of fuel efficiency when a vehicle is being driven in a high elevated area where an atmospheric pressure and a temperature of an intake air are low.

BRIEF DESCRIPTION OF THE DRAWINGS

The drawings are intended to be used as references for describing the exemplary embodiments of the present disclosure, and the accompanying drawings should not be construed as limiting the technical spirit of the present disclosure.

DETAILED DESCRIPTION

Figure 1:
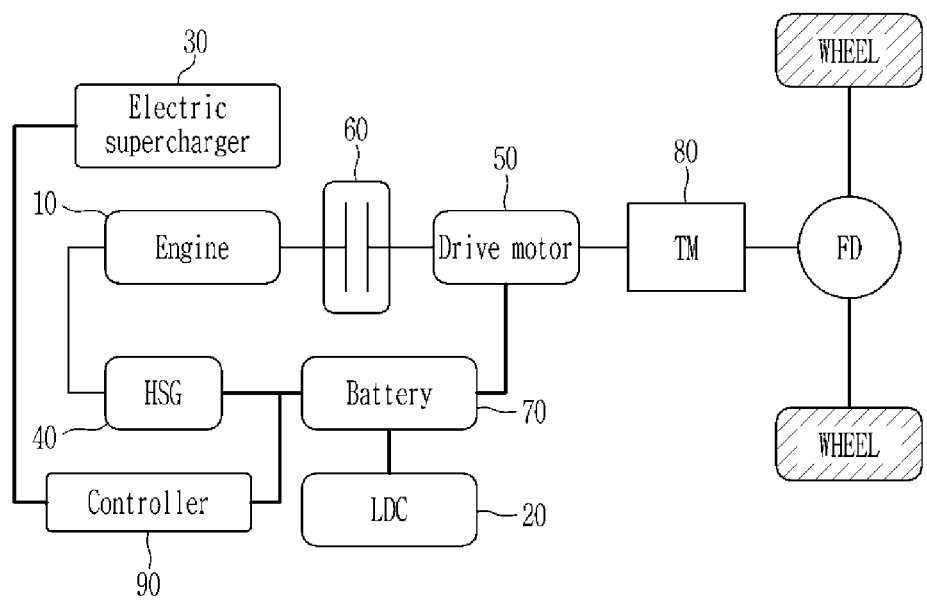
FIG. 1 is a schematic diagram of an apparatus of controlling a hybrid vehicle including an electric supercharger according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure. The drawings and description are to be regarded as illustrative in nature and not restrictive, and like reference numerals designate like elements throughout the specification. Also, the size and thickness of each element are arbitrarily shown in the drawings, but the present disclosure is not necessarily limited thereto, and in the drawings, the thickness of layers, films, panels, regions, etc., are exaggerated for clarity.

Figure 2:
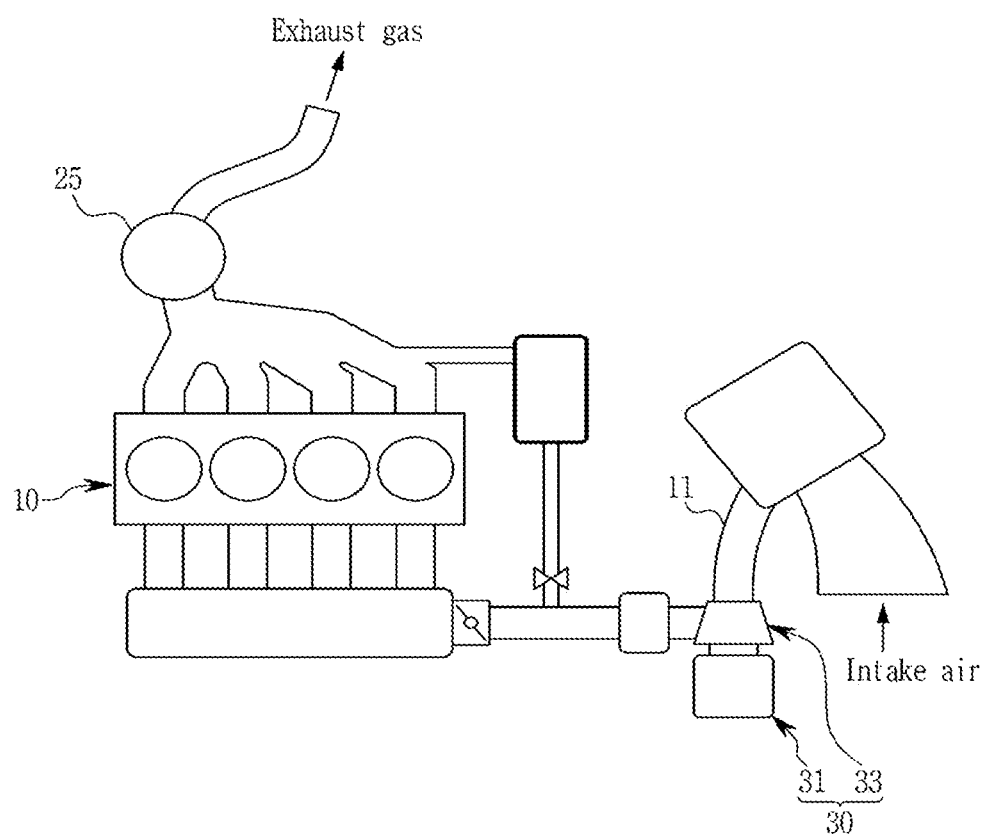
FIG. 2 is schematic diagram illustrating a relationship between a hybrid vehicle and an electric supercharger according to an exemplary embodiment.

Hereinafter, an apparatus of controlling an engine including an electric supercharger and a method thereof according to an exemplary embodiment is described in detail reference to the drawings. FIG. 1 is a schematic diagram of an apparatus of controlling a hybrid vehicle including an electric supercharger according to an exemplary embodiment of the present disclosure. And FIG. 2 is schematic diagram illustrating a relationship between a hybrid vehicle and an electric supercharger according to an exemplary embodiment.

Figure 3:
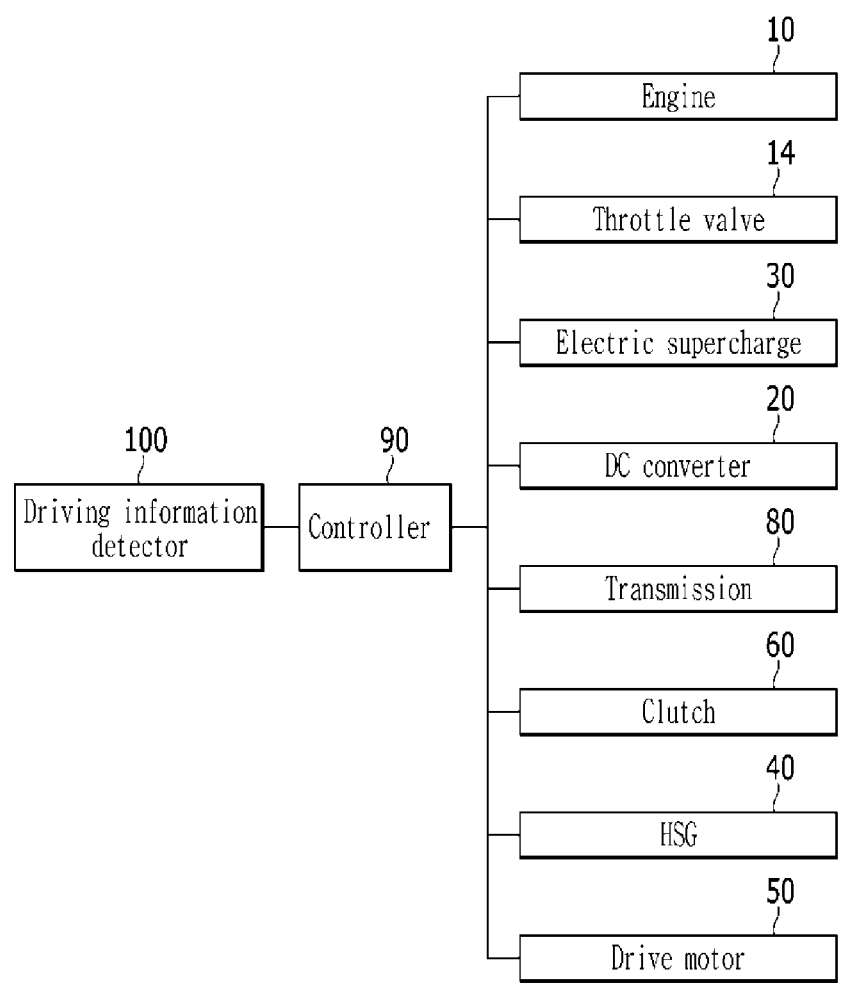
FIG. 3 is a block diagram illustrating an apparatus of controlling an engine including an electric supercharger according to an exemplary embodiment of the present disclosure.

Hereinafter, a hybrid vehicle according to an exemplary embodiment takes an example of a transmission mounted electric device (TMED) structure. However, the scope of the present disclosure is not limited thereto, and may be applied to another type of hybrid electric vehicle. As shown in FIG. 1 to FIG. 3, a hybrid vehicle applied with an apparatus of controlling or operating an engine including an electric supercharger according to an exemplary embodiment of the present disclosure may include a driving information detector 100, an engine 10, a hybrid starter and generator (HSG) 40, a drive motor 50, a clutch 60, a battery 70, a low voltage DC converter (20, LDC: low-voltage DC/DC converter), an electric supercharger 30, and controller 90.

The driving information detector 100 may be configured to detect driving information including an engine speed, a required torque (or, required power) of a driver, an atmospheric pressure, an intake temperature, and a state of charger (SOC) of the battery, and the driving information is transmitted to the controller 90. Accordingly, the driving information detector 100 may include a speed sensor configured to sense the engine speed, an accelerator pedal sensor configured to sense the required torque of the driver, a pressure sensor configured to sense the atmospheric pressure, and a temperature sensor configured to sense the intake temperature. Further, the SOC of the battery 70 may be configured to receive from a battery management system (BMS) that manages the battery 70.

The drive motor 50 may be operated using an electrical energy charged in the battery 70, and the electrical energy generated by the drive motor 50 and the HSG 40 may be charged in the battery 70. The electric supercharger 30 may be configured to supply a charged air to a combustion chamber of the engine, and may include a motor 31 and an electric compressor 33. The electric compressor 33 may be operated by the motor 31 and may be configured to compress ambient air based on driving conditions to supply the compressed air to the combustion chamber. The apparatus of controlling the hybrid vehicle according to an exemplary embodiment of the present disclosure may be configured to change output of the engine and the driver motor based on the SOC of the battery 70.

Figure 4:
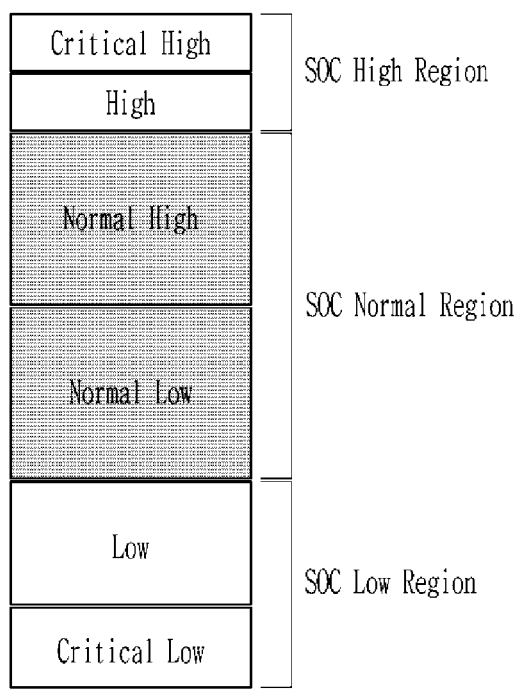
FIG. 4 is a schematic diagram illustrating SOC regions of a battery according to an exemplary embodiment.

Referring to FIG. 4, SOC region of the battery 70 may be divided into a high region (SOC High), a normal region (SOC Normal), and a low region (SOC low). In addition, the high region may be divided into critical high (CH) and high (H) regions, the normal region may be divided into normal high (NH) and normal low (NL) regions, and the low region may be divided into low (L) and critical low (CL) regions.

The low voltage DC converter 20 (LDC) may be configured to convert a low voltage DC (direct current) output from the battery 70 into a corresponding DC of operating voltage of the each electric component. In other words, the low voltage DC converter 20 configured to convert and output the low voltage DC output from the battery 70 to DC corresponding to the operating voltage of the electric supercharger 30, and DC corresponding to the operating voltage of the electronic components of the vehicle.

The accelerator pedal position sensor may be configured to detect an operation of the accelerator pedal. The accelerator pedal position detected by the accelerator pedal position sensor may be transmitted to the controller 90. The controller 90 may then be configured to determine a requested power based on the driver's acceleration intention from the accelerator pedal position detected from the accelerator pedal position sensor, and the driving mode may be selectively transited to electric vehicle (EV) mode, hybrid electric vehicle (HEV) mode, and engine mode.

The controller 90 may be configured to operate constituent elements of the vehicle including the engine 10, the HSG 40, the drive motor 50, the electric supercharger 30, the battery 70 and the clutch 60. The controller 90 may be provided as at least one processor operable by a predetermined program, where the predetermined program may include instructions to respective steps of a method of controlling an engine including an electric supercharger based on a driver's tendency according to an exemplary embodiment.

The clutch 60 may be disposed between the engine 10 and the drive motor 50, and based on whether the clutch 60 is engaged, the hybrid vehicle may be operated in the electric vehicle (EV) mode or in the hybrid electric vehicle (HEV) mode. The EV mode is a mode in which the vehicle is driven by the driving torque of the motor, and the HEV mode is a mode in which the vehicle is driven by the driving torque of the motor and the engine 10. The driving power output from the engine 10 and the drive motor 50 may be transmitted to a drive wheel provided in the vehicle. Additionally, a transmission 80 may be disposed between the clutch 60 and the drive wheel. A shifting gear may be installed within the transmission 80, and the torque output from the engine 10 and the drive motor 50 may be shifted according to a shift-stage.

Figure 5:
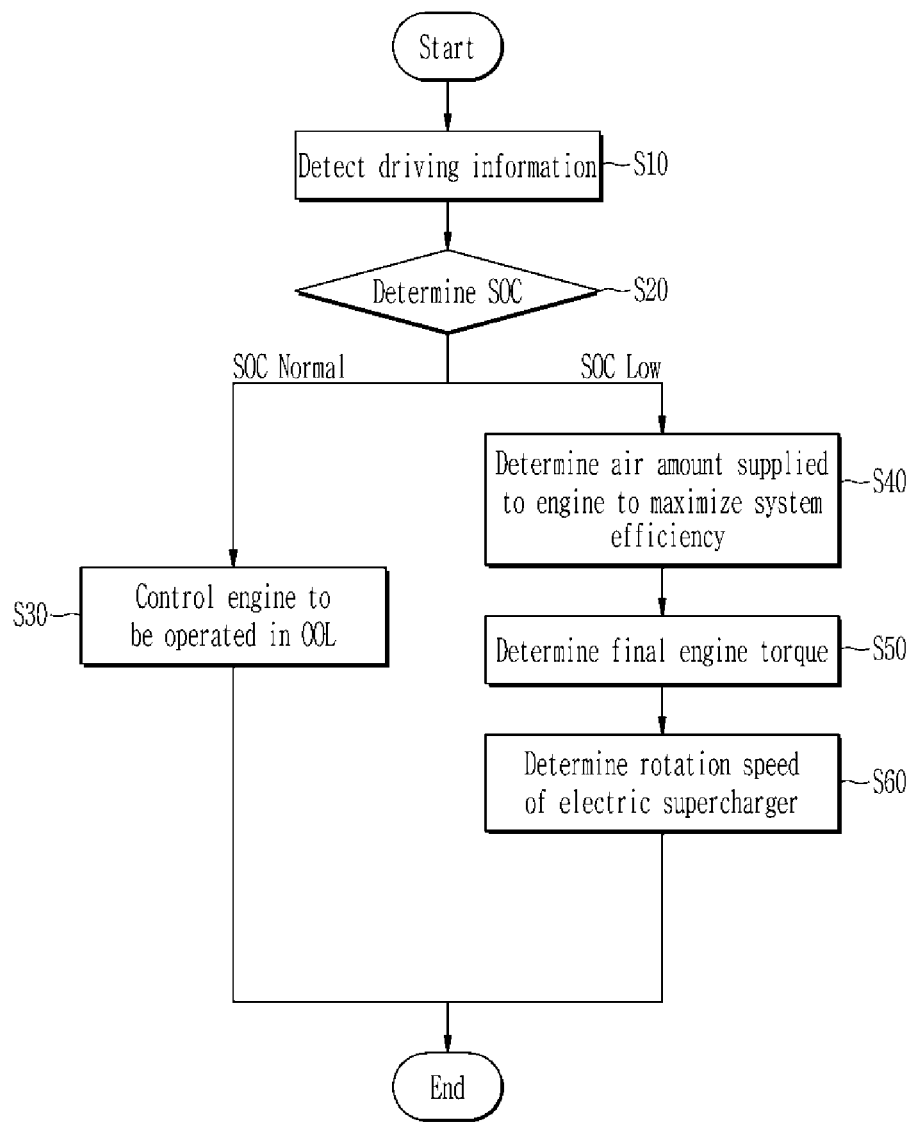
FIG. 5 is a flowchart illustrating a method of controlling a hybrid vehicle according to an exemplary embodiment of the present disclosure.

Hereinafter, a method of controlling an engine including an electric supercharger according to an exemplary embodiment of the present disclosure is described in detail reference to the drawings. As shown in FIG. 5, the driving information detector 100 may be configured to detect the driving information including the engine speed, the required torque (or, require power) of the driver, the atmospheric pressure, the intake temperature, and the SOC of the battery, and the detected driving information by the driving information detector 100 may be transmitted to the controller 90 at step S10.

The controller 90 may be configured to determine the SOC of the battery at step S20, when the SOC is greater than the SOC low region (e.g., SOC Normal or SOC High), the controller 90 may be configured to operate the engine 10 in an optimal operating line (OOL) at step S30. That is, when the required torque of the driver is greater than an engine torque in the OOL, the engine output (e.g., engine torque) may be assisted by the drive motor 50 to satisfy the required torque of the driver. In other words, a difference between the required torque of the driver and the engine torque is assisted by the torque of the drive motor 50. On the contrary, when the required torque of the driver is less than the engine torque at the OOL, the drive motor 50 may be operated in as a generator to generate electric power that corresponds to a differential toque between the required torque of the driver and the engine torque at the OOL, and the electric power generated by the drive motor 50 is charged in the battery 70.

In the SOC low region, the controller 90 may be configured to determine the engine torque to satisfying the required torque of the driver based on a limited output value of the drive motor 50 determined by the SOC of the battery 70 at step S40. In particular, the controller 90 may be configured to determine the engine torque from an optimal air amount to maximize system efficiency. The limited output value of the drive motor 50 may refer to a maximum output power capable of being output from the drive motor 50 in the SOC low region to prevent the SOC of the battery from decreasing down below a predetermined value. Accordingly, the output of the drive motor 50 may be limited under the limited output value of the drive motor 50. In particular, the limited output value of the drive motor 50 may be determined to decrease as the SOC of the battery 70 decrease in the SOC low region. The system efficiency may be determined from following equation 1.

equation 1

$$sys.eff. = \frac{P_{driver}}{M_{fuel} \times LHV + \left(P_{eSC} + P_{LDC} + \frac{P_{driver} - P_{eng}}{\eta_{mot}}\right)/\eta_{tran}},$$

In the equation 1, $P_{driver}$ is the required torque of the driver, $M_{fuel}$ is fuel amount supplied to the engine 10, LHV is a low calorific power of fuel, $P_{esc}$ is consumed power in the electric supercharge 30, $P_{LDC}$ is a supplied power to the DC converter, $P_{eng}$ is the engine power, $\eta_{mot}$ is an efficiency of the drive motor, and $\eta_{tran}$ is a power transmission efficiency.

The fuel amount supplied to the engine 10 may be determined from a function of an air amount supplied to the engine, an engine speed, an atmospheric pressure, and an intake temperature. The fuel amount may be determined from a following equation 2.

$$M_{fuel} = f(M_{air}, RPM, AMP, TIA) \quad \text{equation 2}$$

In the equation 2, $M_{fuel}$ is fuel amount supplied to the engine 10, RPM is the engine speed, AMP is the atmospheric pressure, and TIA is the intake temperature.

In particular, the fuel amount may be calculated from an equation 3 below, and compensation values may be applied as needed.

$$M_{fuel} = M_{air} \times AFR \times \lambda \quad \text{equation 3}$$

In the equation 3, AFR (air fuel ratio) is a theoretical air-fuel ratio, and may be used a constant between 14.5-14.7 range in case of a gasoline engine, and $\lambda$ is an air excess ratio, 1 is used in most driving conditions of the gasoline engine as the air excess ratio, but it is less than 1 in high RPM and high $M_{air}$ condition.

Therefore, $\lambda$ may be determined experimentally according to $M_{air}$ and RPM, and may be stored in the form of map data or approximate formula in the controller in advance. If necessary, compensation values may be applied to the air excess ratio based on the atmospheric pressure or intake temperature. The air excess ratio may be corrected by the following equation 4.

$$\lambda_{final} = \lambda_{base} \times \lambda_{AMP} \times \lambda_{TIA} \quad \text{equation 4}$$

In the equation 4, $\lambda_{final}$ denotes a final air excess ratio, $\lambda_{base}$ an initial air excess ratio, $\lambda_{AMP}$ denotes an atmospheric pressure compensation value, and $\lambda_{TIA}$ denotes an intake temperature compensation value.

The engine power $P_{eng}$ may be determined from a function of the air amount supplied to the engine 10, the engine speed RPM, the atmospheric pressure, and the intake temperature. This may be expressed as following equation 5.

$$P_{eng} = f(M_{air}, RPM, AMP, TIA) \quad \text{equation 5}$$

In the equation 5, $M_{air}$ denotes the air amount supplied to the engine 10, RPM denotes the engine speed, AMP denotes the atmospheric pressure, and TIA denotes the intake temperature.

In particular, the engine power may be calculated from the following equation 6, and, if necessary, a compensation value may be applied to the equation 6.

equation 6

$$P_{eng}[kW] = \frac{2\pi}{60} \times RPM \times T_{eng}[Nm] \times 10^{-3}$$

In the equation 6, $T_{eng}$ denotes an engine torque, the engine torque may be calculated from the following equation 7.

$$T_{eng} = T_{ind,max} \times \eta_{ign} + T_{fric}$$

In the equation 7, $T_{ind,max}$ denotes a maximum indicated torque in a predetermined air amount $M_{air}$ and engine speed RPM, may be experimentally determined according to $M_{air}$ and RPM, and may be stored in the form of map data or approximate formula in the controller. Additionally, $\eta_{ign}$ denotes a torque efficiency according to an ignition timing, and may be expressed as an approximate expression of secondary or cubic polynomial according to the ignition timing. The torque efficiency according to the ignition timing may be experimentally determined based on $M_{air}$ and RPM, and may be stored in the in the form of map data or approximate formula in the controller. $T_{fric}$ denotes a friction torque of the engine in a predetermined air amount $M_{air}$ and engine speed RPM, may be experimentally determined according to $M_{air}$ and RPM, and may be stored in the form of map data or approximate formula in the controller.

Accordingly, $T_{eng}$ and $M_{air}$ may be expressed in a function of only the engine speed RPM. In addition, correction may be performed by applying the effect of TIA or AMP in the final calculation process of $T_{eng}$ or in the calculation process of each factor.

The consumed power in the electric supercharge 30 $P_{esc}$ may be determined from a function of an optimal air amount supplied to the engine 10, the engine speed, the atmospheric pressure, and intake temperature. This may be expressed as following equation 8.

$$P_{eSC} = f(M_{air}, RPM, AMP, TIA) \quad \text{equation 8}$$

In the equation 8, $M_{air}$ denotes the air amount supplied to the engine 10, RPM denotes the engine speed, AMP denotes the atmospheric pressure, and TIA denotes the intake temperature. Additionally, $P_{esc}$ is P a function of the air amount supplied to the engine $M_{air}$ and a pressure ratio of the electric supercharger. $P_{esc}$ may be experimentally determined, and may be stored in the form of map data or approximate formula in the controller.

When determining $P_{esc}$ experimentally, the test may be performed under standard condition. If the intake temperature changes, it may be corrected through a coefficient. For example, $P_{esc}$ may be corrected as the following equation 9.

$$P_{esc} = P_{esc,ref} \times f_{TIA}$$

In the equation 9, $P_{esc,ref}$ denotes a power of the electric supercharger under the standard condition, and $f_{TIA}$ denotes a correction coefficient of intake temperature.

Meanwhile, the pressure ratio PR is a dimensionless number, and represents a pressure ration between an upstream and a downstream of the electric supercharger. This may be expressed as following equation 10.

equation 10

$$PR = \frac{P_{boost}}{AMP + P_{loss,int}}$$

wherein $P_{loss}$ denotes a pressure loss in an intake duct, an intake pipe, or an air filter, etc. It can be neglected or experimentally determined to approximate as the secondary or cubic polynomial of $M_{air}$. Additionally, $P_{boost}$ denotes the required boost pressure, is a function of $M_{air}$ and RPM and may be determined experimentally.

The efficiency of the drive motor $\eta_{mot}$ may be determined from a function of a motor torque and a motor speed, and may be stored in the form of map data or approximate formula in the controller. This may be expressed as following equation 11.

$$\eta_{mot} = f(T_{driver} - T_{eng}, rpm)$$

In the equation 11, $T_{driver}$ denotes the required torque of the driver, $T_{eng}$ denotes the engine torque, and rpm denotes the motor speed.

In a TMED type hybrid vehicle, the motor speed is the same as the engine speed. Accordingly, the motor torque may be expressed as the following equation 12.

$$T_{mot} = T_{driver} - T_{eng} \quad \text{equation 12}$$

In the equation 11, $T_{driver}$ denotes the required torque of the driver, $T_{eng}$ may be calculated through the equation 5.

The power transmission efficiency ($\eta_{tran}$) may be determined from a function of the consumed power in the electric supercharge 30 $P_{esc}$, the supplied power to the DC converter $P_{LDC}$, the required power of the driver, the engine power, and the efficiency of the drive motor $\eta_{mot}$. This may be expressed as following equation 13.
equation 13

$$\eta_{tran} = f\left(P_{esC} + P_{LDC} + \frac{P_{driver} - P_{eng}}{\eta_{mot}}\right)$$

The power transmission efficiency $\eta_{tran}$ is a transmission efficiency of power in a high voltage power system of a hybrid vehicle, is a function of power consumed in the electric components or supplied to the electric components, and may be stored as a map data format or approximate form in the controller. The power consumed or supplied in the high voltage power system of the hybrid vehicle may include the power consumed by the electric supercharger 30 $P_{esc}$, the power supplied to the DC converter $P_{LDC}$, and the power consumed by the motor $P_{mot}$.

In particular, power consumed by the motor $P_{mot}$ may be expressed to the following equation 14.
equation 14

$$T_{mot} = \frac{P_{driver} - P_{eng}}{\eta_{mot}}$$

In the above equations, the required power (or, torque) of the driver is a value determined from a change amount of the accelerator pedal, and is a constant. The power supplied to the DC converter is a constant, and the low calorific value of fuel is also constant. Accordingly, the controller may be configured to receive the atmospheric pressure, intake temperature, and engine speed from the driving information detector 100 and determine the optimal air amount (Mair) using equation 1 at step S40.

The controller 90 may be configured to determine a final engine torque to be output in the engine 10 from the optimal air amount at step S50. This may be expressed as the following equation 15.

$$T_{eng,final} = f(M_{air}, RPM, AMP, TIA)$$

Further, the controller 90 may be configured to determine the rotation speed of the electric supercharger 30 to supply the determined optimal air amount $M_{air}$ to the engine, and determine the power consumed by the electric supercharger 30 at step S60. For example, when the operating point of the engine for outputting the final engine torque is positioned at the optimal operating point in the NA engine (natural aspiration engine), the controller 90 may be configured to stop the operation of the electric supercharger 30. On the other hand, when the operating point of the engine 10 for outputting the final engine torque is greater than the optimal operating point of the NA engine, the controller 90 may be configured to operate the electric supercharger 30 to supply supercharged air to the engine 10 to thus operate the engine in the region of the optimal operating point.

Figure 6A:
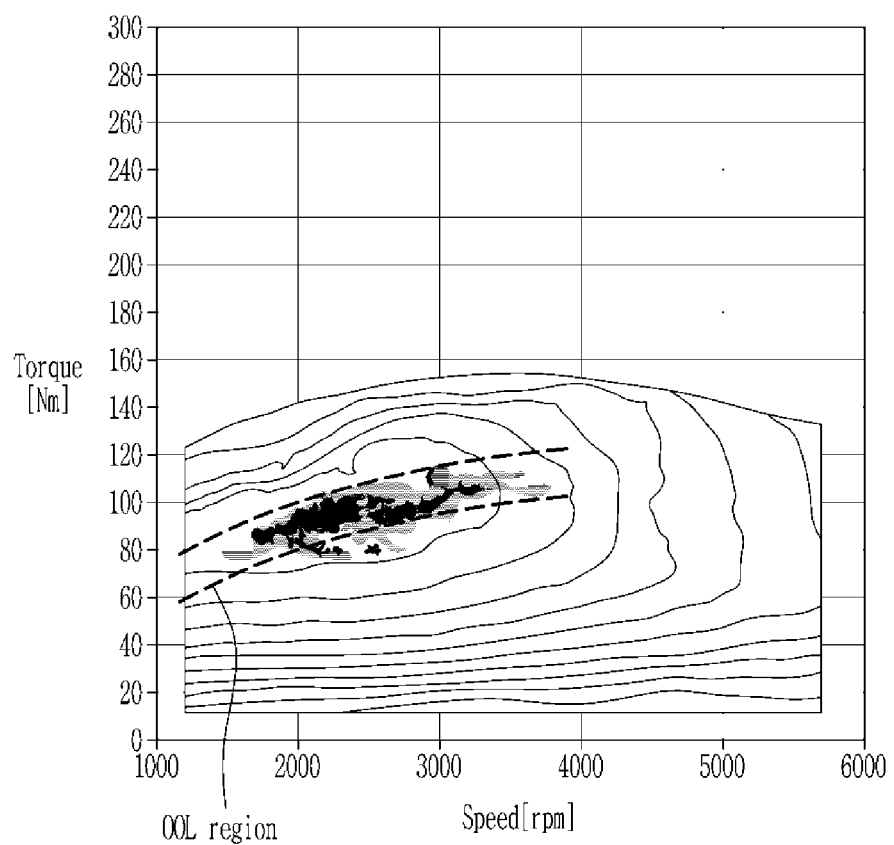
FIGS. 6A-6B are drawings illustrating an operating point of an engine according to an exemplary embodiment of the present disclosure.
Figure 6B:
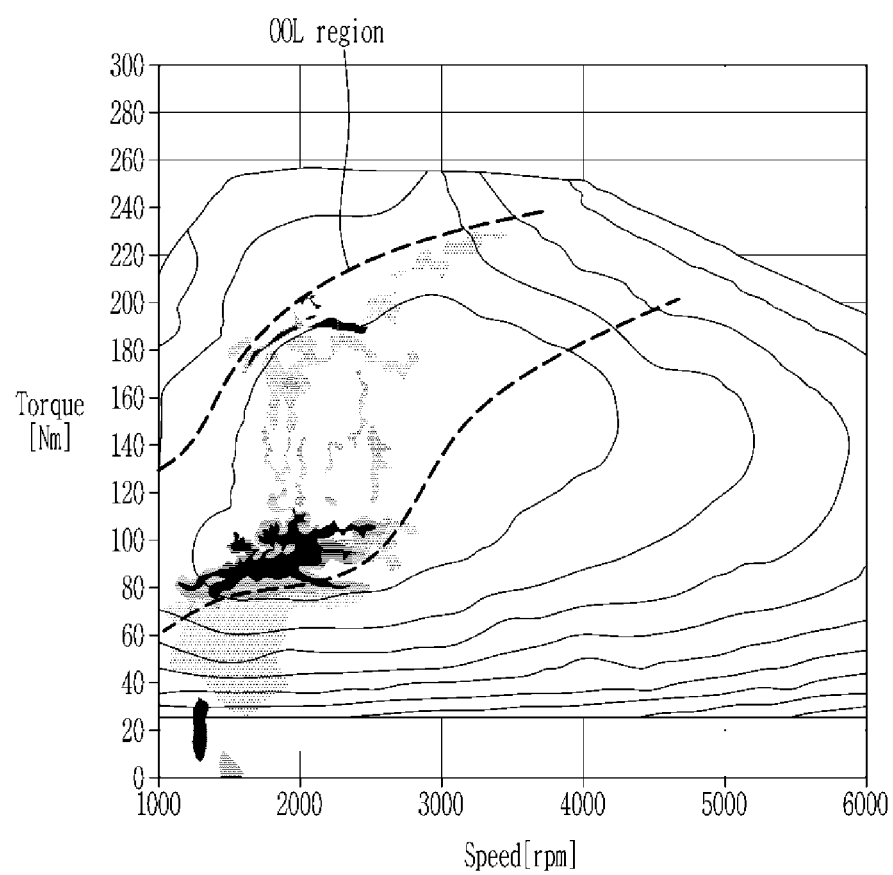

Referring to FIG. 6A, in the case of a natural intake engine, the area where the engine operates at the optimum operating point is very narrow. On the other hand, referring to FIG. 6B, in the engine to which the electric supercharger 30 is applied, the area where the engine is operated at the optimal operating point is relatively wide compared to the natural intake engine. Accordingly, when the vehicle is being driven in an area where the atmospheric pressure is low or intake temperature is low, even though the power assistance by the drive motor 50, the engine may be operated in a region of the optimal operating point, thereby improving fuel efficiency of the vehicle and reducing emission.

Description of Symbols
10: engine
11: intake line
30: electric supercharger
40: HSG
50: drive motor
60: clutch
70: battery
80: transmission
90: controller
100: driving information detector While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

What is claimed is:

1. An apparatus of controlling a hybrid vehicle including an electric supercharger, the apparatus comprising:
   an engine configured to combust fuel to generate power;
   a drive motor configured to assist the power generated by the engine and to selectively operate as a generator to generate electrical energy;
   a clutch disposed between the engine and the drive motor;
   a battery configured to supply electrical energy to the drive motor or to be charged by the electrical energy generated at the drive motor;
   a direct current (DC) converter configured to transform a direct current output from the battery;
   an electric supercharger configured to supply supercharged air to the engine; and
   a controller configured to:
   determine an optimal air amount to maximize a system efficiency based on a limited output value of the drive motor determined by a state of charge (SOC) of the battery; and
   determine a drive motor power output from the drive motor and an engine power output from the engine based on the optimal air amount when an atmospheric pressure is less than a predetermined pressure, intake temperature is greater than a predetermined temperature and the SOC is less than a predetermined value.

2. The apparatus of claim 1, wherein the system efficiency is determined from a driver required power, a fuel amount supplied to the engine, a low calorific power of fuel, a consumed power in the electric supercharger, an output power supplied to the DC converter, an engine power output from the engine, an efficiency of the drive motor, and power transmission efficiency.

3. The apparatus of claim 2, wherein the system efficiency is determined from an equation of:

$$sys.eff. = \frac{P_{driver}}{M_{fuel} \times LHV + \left(P_{eSC} + P_{LDC} + \frac{P_{driver} - P_{eng}}{\eta_{mot}}\right)/\eta_{tran}}$$

wherein $P_{drive}$ is a required power of a driver, $M_{fuel}$ is fuel amount supplied to the engine, LHV is low calorific power of fuel, $P_{esc}$ is consumed power in the electric supercharger, $P_{LDC}$ is a consumed power in the DC converter, $P_{eng}$ is an engine power, $\eta_{mot}$ is an efficiency of the drive motor, and $\eta_{tran}$ is a power transmission efficiency.

4. A method of controlling a hybrid vehicle including an electric supercharger, comprising:
 receiving, by a controller, a driving information including a driver required power, an engine speed, a state of charge (SOC) of a battery, an atmospheric pressure, and an intake temperature;
 determining, by the controller, an optimal air amount to maximize a system efficiency based on a limited output value of the drive motor determined by the SOC of the battery when the SOC is less than a predetermined value;
 determining, by the controller, an engine torque output from the engine from the optimal air amount; and
 determining, by the controller, an output torque of the drive motor for satisfying the required torque of the driver from the engine torque.

5. The method of claim 4, wherein the system efficiency is determined from the driver required power, a fuel amount supplied to the engine, a low calorific power of fuel, a consumed power in the electric supercharger, an output power output from the DC converter, an engine power output from the engine, an efficiency of the drive motor, and power transmission efficiency.

6. The method of claim 5, wherein the system efficiency is determined from an equation of:

$$sys.eff. = \frac{P_{driver}}{M_{fuel} \times LHV + \left(P_{eSC} + P_{LDC} + \frac{P_{driver} - P_{eng}}{\eta_{mot}}\right)/\eta_{tran}}$$

wherein $P_{drive}$ is a required power of a driver, $M_{fuel}$ is fuel amount supplied to the engine, LHV is a low calorific power of fuel, $P_{esc}$ is consumed power in the electric supercharger, $P_{LDC}$ is a supplied power to the DC converter, $P_{eng}$ is an engine power, $\eta_{mot}$ is an efficiency of the drive motor, and $\eta_{tran}$ is a power transmission efficiency.

* * * * *